UNITED STATES PATENT OFFICE.

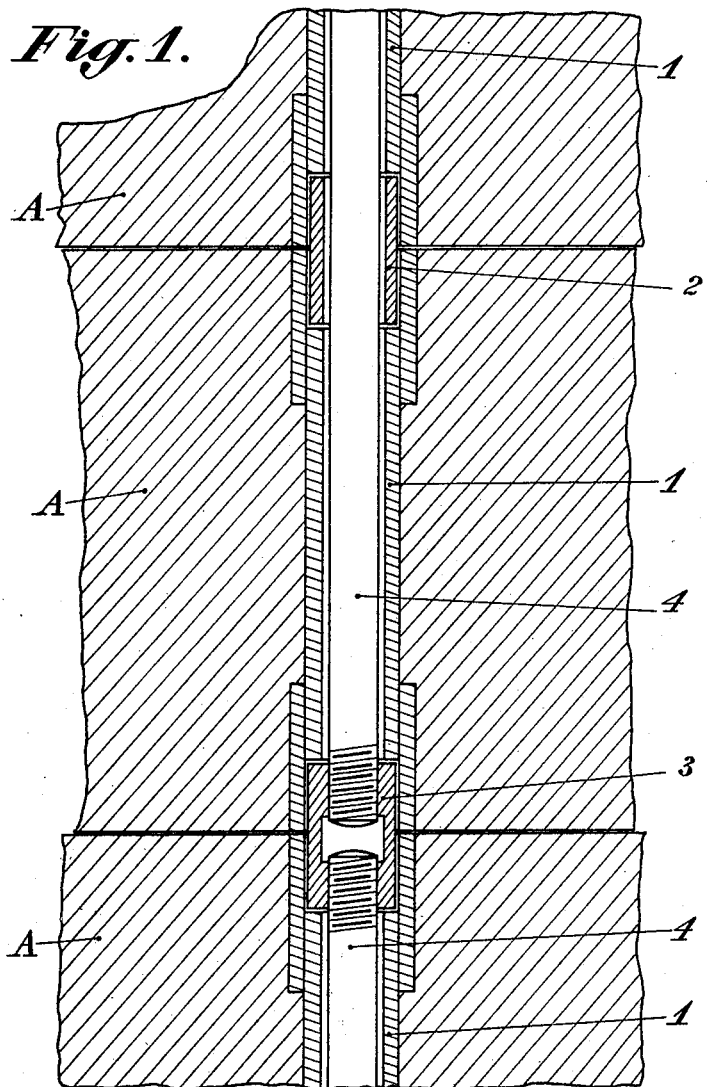
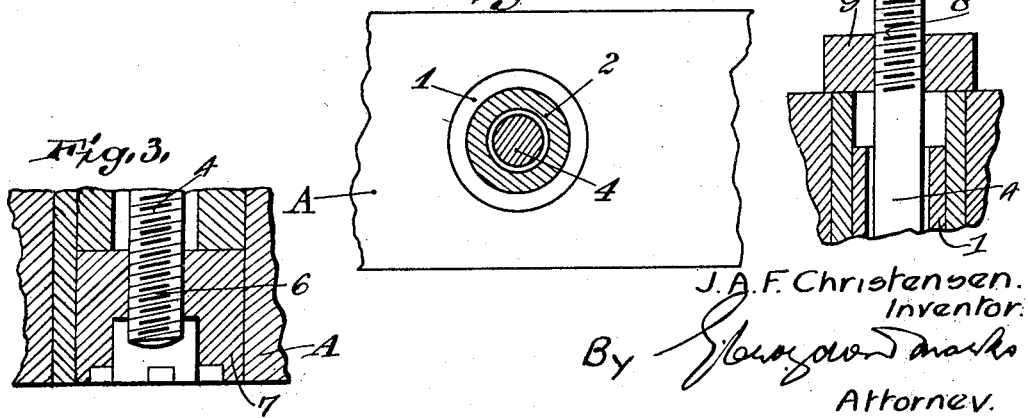

JÖRGEN ANTON FREDERIK CHRISTENSEN, OF ODENSE, DENMARK.

DEVICE FOR JOINING CONCRETE BLOCKS DISPOSED IN A PILLAR OR IN SERIES.

1,385,606.   Specification of Letters Patent.   Patented July 26, 1921.

Application filed October 16, 1916. Serial No. 125,996.

*To all whom it may concern:*

Be it known that I, JÖRGEN ANTON FREDERIK CHRISTENSEN, civil engineer, a subject of the King of Denmark, residing at No. 18 Hans Tausensgade, Odense, Denmark, have invented certain new and useful Improvements in Devices for Joining Concrete Blocks Disposed in a Pillar or in Series, of which the following is a specification.

This invention relates to the joining or connecting of concrete blocks and especially to the connecting of blocks of reinforced concrete, which are arranged in series or pillar formation and the object of the invention is to facilitate the joining or connecting and to make the joints more durable. A further object of the invention is to provide joining members which will be subjected to pulling strains only.

The invention is characterized by the combined use of the following means:—

1. One or more pipes embedded in each concrete block, said pipe or pipes extending from one joining surface of the block to the opposite joining surface, and the ends of said pipes being preferably approximately flush with the joining surfaces.

2. Means by which the pipe ends facing each other in the concrete blocks can be guided in relation to each other, so that the pipes in the successive concrete blocks form a continuous passage and are insured against lateral strains.

3. Joining members in the form of a bolt inserted into the aforesaid passage and insured against lateral strains by said pipes, and said bolts in connection with suitable tension means serving to clamp together a number of concrete blocks in the pillar or series.

In the accompanying drawing I have shown the invention in detail and in this drawing Figure 1 is a longitudinal sectional view of a portion of the pillar or series of concrete blocks and showing the manner of connecting the blocks and the meeting ends of the connecting bolts.

Fig. 2 is a horizontal sectional view of the same.

Fig. 3 is a detail illustrating the manner of connecting the lower end of one of the bolts to the bottom block of the series.

Fig. 4 is a detail showing the means employed for connecting the upper end of one of the bolts to the upper or top block of the series.

Referring to the drawing 1 represents pipes, one of which is embedded in each of the blocks A. Each of these pipes are provided with enlarged ends or sockets for the reception of coupling members 2 or 3. The pipes of the blocks are arranged in alinement so that their interiors form a continuous passageway for the reception of connecting bolts 4. The coupling member 2 is in the form of a sleeve which is inserted into the adjacent sockets of enlarged ends of two abutting blocks and the bolt 4 is adapted to pass through this coupling member 2. The coupling member 3 is provided with internal threads for engagement with external threads on the meeting ends of the bolts 4.

As shown in Fig. 3, the lower end of the lower bolt 4 is threaded as shown at 6 to engage a nut 7 which is screwed into the lower socket of the bottom block A.

In Fig. 4 I have shown the means for connecting the upper end of the upper bolt to the top block and in this figure the upper end of the bolt is threaded as shown at 8 to receive a nut 9 which engages the upper face of the upper socket of the top block and is adapted to clamp the blocks together.

In use the blocks are arranged in series with the pipes 1 in alinement and the coupling members 2 are provided at certain joints in the passage in order to connect certain of the blocks A, while the threaded coupling member 3 is arranged at a point to be engaged at the meeting ends of the bolts 4, so that by tightening the threaded members 3, 7 and 9, the blocks can be securely connected together.

What I claim and desire to secure by Letters Patent is:—

1. A device for joining concrete blocks comprising a pipe embedded in each of said blocks, said pipes forming a continuous passage when the blocks are placed in position with relation to one another, a plurality of bolt members arranged in alinement with each other in said passage, a coupling member connecting the adjacent ends of said bolt members, said coupling member projecting into the passage of adjacent pipes and being of a size in cross-section approximately equal to the cross sectional area of the passage for preventing transverse movement of one block relatively to an adjacent block, and means for clamping the two extreme ends of the bolt members to the end blocks.

2. A device for joining concrete blocks comprising a pipe embedded in each of said blocks, said pipes having enlarged ends and forming a continuous passage when the blocks are placed in position with relation to one another, a plurality of bolt members arranged in alinement with each other in said passage, a coupling member connecting the adjacent ends of said bolt members, said coupling member projecting into the passage of adjacent pipes and being of a size in cross-section approximately equal to the cross-sectional area of the passage for preventing transverse movement of one block relatively to an adjacent block, and means for clamping the two extreme ends of the bolt members to the end blocks.

3. A device for joining concrete blocks comprising a pipe embedded in each of said blocks, said pipes having enlarged ends and forming a continuous passage when the blocks are placed in position with relation to one another, a plurality of bolt members arranged in alinement with each other in said passage, an internally screw-threaded coupling member located in the space formed by said enlarged ends and connecting the adjacent ends of said bolt members by means of screw threads on the latter, said coupling member projecting into the passage of adjacent pipes and being of a size in cross-section approximately equal to the cross-sectional area of the passage for preventing transverse movement of one block relatively to an adjacent block, and means for clamping the two extreme ends of the bolt members to the end blocks.

4. The combination with a series of superposed blocks, of a pipe arranged in each of said blocks, said pipes forming a continuous passage through the block, each of said pipes having enlarged ends to provide enlarged chambers in the passage arranged at the points of abutment of the blocks, a plurality of bolts arranged in the passage and having their adjacent ends threaded and arranged within one of said chambers, and a threaded coupling member located in one of said chambers and secured to the adjacent threaded ends of the bolts, said coupling member having a thickness substantially equal to the cross-sectional area of the last mentioned chamber in order to prevent lateral movement of one block relatively to an adjacent block.

In testimony whereof I affix my signature in presence of two witnesses.

JÖRGEN ANTON FREDERIK CHRISTENSEN.

Witnesses:
ERNEST BOUTARD C. E.,
N. BUSCH-JENSEN, Solicitor.